United States Patent [19]

Malouf et al.

[11] Patent Number: 5,452,435
[45] Date of Patent: Sep. 19, 1995

[54] SYNCHRONIZED CLOCKS AND MEDIA PLAYERS

[75] Inventors: Frederick L. Malouf, Mountain View; Erik R. Neumann, Redwood City, both of Calif.

[73] Assignee: Kaleida Labs, Inc., Mountain View, Calif.

[21] Appl. No.: 41,395

[22] Filed: Mar. 31, 1993

[51] Int. Cl.⁶ .......................... G06F 1/00; G06F 9/44
[52] U.S. Cl. .................. 395/550; 364/251.5; 364/DIG. 1; 395/700
[58] Field of Search .................. 395/550, 700

[56] References Cited

U.S. PATENT DOCUMENTS 5,261,041 11/1993 Susman .

OTHER PUBLICATIONS

*QuickTime Developer's Guide*, Preliminary, Apple Computer, Inc., 1991 (published in the U.S.A.), pp. ii, 1-3 to 1-12, 2-3 to 2-10, 2-147 to 2-162, 2-227 to 2-248, and 5-5 to 5-20.
Poole, Lon, *QuickTime in Motion*, MacWorld, Sep. 1991, pp. 154-159.
Davis, Andrew W. and Joe Burke, The Mac Goes to the Movies, Byte, Feb. 1993, pp. 225-230.
Computer Communications, vol. 15, No. 10, Dec. 1992, Guildford GB, pp. 611-618, G. Blakowski et al. "Tool support for the synchronization and presention of distributed multimedia."
Computer Journal, vol. 36, No. 1, Oct. 1992, Lond GB, pp. 4-18, F. Horn et al. "On programming and supporting multimedia object synchronizaation."
BYTE Vo. 18, No. 2, Feb. 1993, London BG, pp. 225-230, A. W. David et al., "The Mac goes to the movies."

*Primary Examiner*—Kevin A. Kriess
*Assistant Examiner*—John O. Chavis
*Attorney, Agent, or Firm*—Irell & Manella

[57] ABSTRACT

A media player and the clock which controls it are integrated into a single object. This integration may be achieved by the construct of inheritance between objects in an object oriented programming environment. A software class for player objects is established which inherits from a software class for clock objects. In this way, a player "is a" clock. This integration provides improved synchronization among different media, and simplifies design of applications which employ player objects and clock objects. Each object is synchronized to a RootClock object which operates at the speed of the fastest media player in the system. The RootClock may be separated into "low" order and "high" order components and a compare register in order to reduce interrupt overhead.

16 Claims, 5 Drawing Sheets

SCALE = 3
RATE = 1

SCALE = 3
RATE = 2

SCALE = 4
RATE = 1

SCALE = 4
RATE = 4

0 SECONDS    ABSOLUTE TIME IN SECONDS    1 SECOND

SYNCHRONIZED CLOCKS AND MEDIA PLAYERS

CROSS REFERENCES

The present invention is related to copending, and copending, commonly assigned U.S. patent application Ser. No. 08/040,479, now abandoned entitled "Time-Based Script Sequences" (Attorney Docket no. 55378.0027), which is incorporated by reference herein.

BACKGROUND

The present invention relates to the field of multimedia methods and apparatus, and more particularly to methods and apparatus allowing for synchronization and control of time-based media in a multimedia computer environment.

With regard to modern computer systems, the term multimedia is often used in referring to software for processing (e.g., creating, editing, displaying, synchronizing, etc.) one or more files of time-based data. Examples of time-based data include video sequences, audio sequences, time-recorded events such as data from measuring devices, etc. Devices (hardware or software) capable of processing multimedia data are commonly referred to as multimedia players. Typical examples include personal computers and custom CD ROM-based devices designed for such a purpose.

The time-based data is typically stored in (or on) a hardware memory device, for example the read-only memory (ROM) of a computer, a computer's magnetic disk drive, an audio or ROM compact disk (CD), video tape devices, etc. The time-based data may also be generated for processing in real time. For example, computer-generated animation image data may be generated for display from animation control data, without having previously been stored.

The type of data is its "media." That is, media defines the data. For example, digital data is comprised of the binary values 0 or 1. In order to interpret that data, a player must know which media is represented by that data. Hence, devices (principally software) capable of processing the data provided by these hardware memory devices are commonly referred to as media players.

A movie is a common metaphor used in the discussion of multimedia software and hardware. While the traditional "movie" (e.g., of the type shown in a theater) is a stream of discrete data, in time order, stored in a single format such as film, tape, optical disk, etc., multimedia "movies" need not be so organized. Rather, multimedia movies may be made up of a number of sequences whose data may be stored on disparate devices in non-sequential order. Thus, one important role for multimedia players is to organize and coordinate the processing of data.

Authors of multimedia movies (or "titles") need to control and synchronize a variety of time-based multimedia components or "players," such as audio and video streams, animation sequences, time-based scripts and full-motion movies. Rather than require the author of each application to maintain complete control over these components, many computer operating systems now include "extensions" which provide higher-level abstractions (such as clock objects and associated media "player" objects) to simplify the author's task. Examples of such systems include "Multimedia Extensions" to the Windows 3.1 operating system environment for IBM-compatible personal computers, from Microsoft Corporation, Redmond, Washington, and the "Quick-Time" extension to the Apple Macintosh System 7.x system software, from Apple Computer, Inc., of Cupertino, California. QuickTime is described in detail in the QuickTime Developer's Guide, also available from Apple Computer, Inc., and which is incorporated by reference herein.

QuickTime essentially allows a multimedia player to process timebased data. Since the data are time based, QuickTime provides for the description of "time" (called time basis) for the data as well as a definition of the context for evaluating that "time." In QuickTime, a movie's or media's time basis is called its "timebase."

A timebase is essentially a vector that defines the direction and velocity of time for a movie or media. The context for a timebase is called its time coordinate system. Conceptually, a time coordinate system provides an axis for measuring time. The time coordinate system, like a geometrical axis, is divided into units of measurement by a measurement system, called a time scale.

A timebase defines a current time value and the rate at which time passes for the movie or the media, but does not define the scale. Rather, the scale is obtained from the media itself. The product of rate and the time scale is called the absolute rate, and is measured for example in units per second. Although timebases exist independent of any specific coordinate system, time values extracted from a timebase are meaningless without a time scale.

Associated with each timebase is a clock which provides the timing for the timebase. QuickTime clocks are implemented as components that are managed by a part of the QuickTime architecture referred to as the Component Manager. Clock components provide two basic services: generating time information and scheduling time-based events, called CallBack events.

Clock components themselves receive information from other elements, which they use to produce and to provide their timing information. For example, a clock component may use the Macintosh "tick" count to provide its basic timing information. Alternatively, a clock component could use some special hardware installed in the computer to provide its basic timing information.

In any event, the clock component ultimately derives its timing information from a hardware clock, either directly or indirectly. A hardware clock is generally a signal generator of the type known in the art, which emits pulses or clock "ticks" many times per second (e.g., a 1 MHz clock ticks one million times per second).

Hardware clocks are frequently associated with "counters" that keep track of units of time by incrementing their value after each clock tick of a given rate. While hardware clocks generally emit a predetermined, fixed number of ticks per second, software clocks such as clock components allow for the manipulation of various aspects or values of the clock, allowing control of rate, etc.

For example, many computer systems employ a single hardware "root clock" (and an associated counter), which is typically used as a base to which various software clocks, such as clock components, are synchronized. These software clocks must convert the time units of the RootClock (e.g., 60 ticks/sec) to their desired time units (e.g., 44,100 ticks/sec for CD-quality audio).

Both media and movies have timebases. In QuickTime, multimedia movies are comprised of one or more "tracks" which are organized references to the media from which the time-based data are obtained. Each track is associated with a single media. A movie's timebase allows the tracks to be synchronized. In QuickTime, every track begins at the same time, at the beginning of the movie. In order to "start" the data of the track at some time other than the beginning of the movie, the data are "offset" from the start of the movie. By starting each track at the same time, one aspect of synchronizing the various tracks is addressed.

Each track or media has its own timebase. Every timebase contains a rate, a start time, a stop time, a current time, and some status information. Although ultimately each timebase obtains its time values from a clock component, it may do so indirectly. A timebase may obtain its time values directly from another timebase. The timebase obtaining its time values from another timebase is referred to as a slave timebase, and the timebase providing time values to other timebases is referred to as a master timebase. A master timebase may have multiple slave timebases, but a slave timebase may have only a single master timebase. (That is, a clock can be synchronized to only one clock, but can have any number of clocks synchronized to it.)

As an example, a first media may be a stream of digitized video data, and a second media may be a stream of digitized sound data. It may be desirable to "play" the sound at a specific time in the video data stream, such as 10 seconds into the video data stream. Thus, it is useful to be able to tie one media's timebase to another media's timebase.

QuickTime provides for the creation, use, and editing of timebase values. To support the value of tying one media's timebase to another media's timebase, changes made to master timebases may ripple through to slave timebases. For example, if the current time of a master timebase is changed, the current time of the slave timebases are changed appropriately.

However, changes to timebase values do not ripple up. That is, if the current time of a slave timebase is changed, the offset between the movie start time and the data start time is changed, but the current time of the master timebase is not changed.

It will thus be appreciated that QuickTime provides an effective mechanism for controlling and synchronizing different media, despite each media having its own timebase with its own rate and offset. However, it will be appreciated that the mechanism provided by QuickTime for the synchronization of the various media is also quite complex, principally because the media and its associated timebase are conceptually different. In order to access or change the time values associated with a particular media, the timebase for the media, not the media itself, must be addressed. For example, to find out at what point in time the media is currently playing, it is necessary to obtain a reference to the media's timebase, then examine the timebase itself. This problem, of requiring indirect access to a player's time parameters, is compounded as the number of players synchronized to one another increases.

Furthermore, QuickTime requires that a movie start at time zero. This makes the task of synchronizing two movies that start at different times (i.e., each having a different zero time relative to each other) complex. For example, since a multimedia movie must start at time zero, no negative start times are allowed. While it is possible to achieve the effect of a negative start time in QuickTime, for example by creating a fictitious start time and using offsets from that start time, this is an unnecessary burden in the creation of multimedia movies. Not only must the offset between the two movies be maintained, possible different rates between the two movies must also be synchronized. These same complexities also occur when a movie is synchronized with some external media.

Finally, the timebases discussed above do not include scale. The values of time returned by a timebase are meaningless without a scale. To determine the value of time returned by a timebase, reference must be made to the media. This two-step process of getting a timebases' time imposes an arbitrary complexity upon an author of a title.

Moreover, the scheduling of future events (e.g., requesting notification when the audio player is "x" time units into the playback of a particular audio passage) is frequently inaccurate. If, as is often the case, the root clock does not operate as fast as a clock associated with a particular media player, then the system cannot accurately determine when the audio passage is at a particular point in time.

For example, if the root clock operates at 60 ticks/second, and the clock controlling the audio playback operates at 44,100 ticks/second, then the system cannot determine when the audio playback reaches audio time unit 100. A total of 735 audio time units pass between every tick of the root clock. Typically, such systems access a faster clock on the computer and approximate the point at which the desired time unit is reached. The problem is that this faster clock is not synchronized to the media player, and therefore is not necessarily accurate (due to the "drift" caused by the time taken to write to a counter).

SUMMARY OF THE INVENTION

The present invention addresses the problems noted above by integrating, both physically and conceptually, media players and the clocks that control them. This system-level integration of clocks and media players provides more accurate synchronization among different media and relieves the author of having to communicate indirectly with multiple clocks and media players, and having to maintain artificial intermediate constructs to facilitate such peripheral activities.

This integration between clocks and media is achieved by the construct of inheritance between objects in an objected oriented programming environment. That is, clocks and media players are integrated by creating a class of media player objects that inherits from a class of clock objects. In object-oriented parlance, instead of a player "has a" clock relationship between a player object and a clock object, a player "is a" clock.

In this manner, all attributes of a clock (e.g., its rate, time, etc.) are inherited by the media player objects conceptually associated with that clock. Thus, direct communication with a media player is facilitated, for example, to obtain the player's current time or to set its time, rate or its offset to a master clock.

The concept of "origin" is introduced in the class definitions to provide for the start of a media at an arbitrary point in time. The origin defines the beginning of the media. Markers are provided to indicate the start and stop times of the media. In this way, any time scale may be associated with a media, and media start times may be set without requiring a separate calculation or application of offsets (since a clock's offset is only relative to its master clock).

At the physical level, all media player objects are slaved to the hardware portion of a RootClock which operates at the speed of the fastest media player in the system (e.g., 44.1 KHz CD-quality audio), thereby facilitating the scheduling of future events at a particular point in time (e.g., corresponding to any individual media sample). Since the speed of the RootClock is equal to the fastest media player in the system, time units for any other media player in the system can be "down-converted" from the rate of the RootClock. Moreover, the speed of the hardware portion of the RootClock is still relatively slow, slow enough to permit sufficient processing between hardware ticks. In another embodiment, separate RootClocks can be employed for the different speeds of each desired media player.

The RootClock includes a counter which maintains a time value. This counter may be entirely hardware, entirely software, or a combination of hardware and software. If a portion of the counter is in hardware, interrupts to the system may be reduced. In this case, it may also be desirable to associate with the hardware portion of the RootClock a compare register of equal size for the purpose of generating interrupts.

BRIEF DESCRIPTION OF THE DRAWINGS

The present invention will be described in greater detail below, including specific examples thereof, with regard to the figures, in which.

As between each of these figures, like reference numerals shall denote like elements.

DETAILED DESCRIPTION

For purposes of illustration, the present invention will be described by way of selected examples (or applications), with reference to a number of embodiments of the present invention where appropriate. It will be apparent to one skilled in the art that the examples, and the environment in which they are developed, demonstrate the functionality and features of the present invention. It will also be apparent to one skilled in the art that certain variations, additions, deletions, modifications, etc., to the examples are contemplated, and that recitation of these examples does not limit the scope of the invention.

Figure 1:
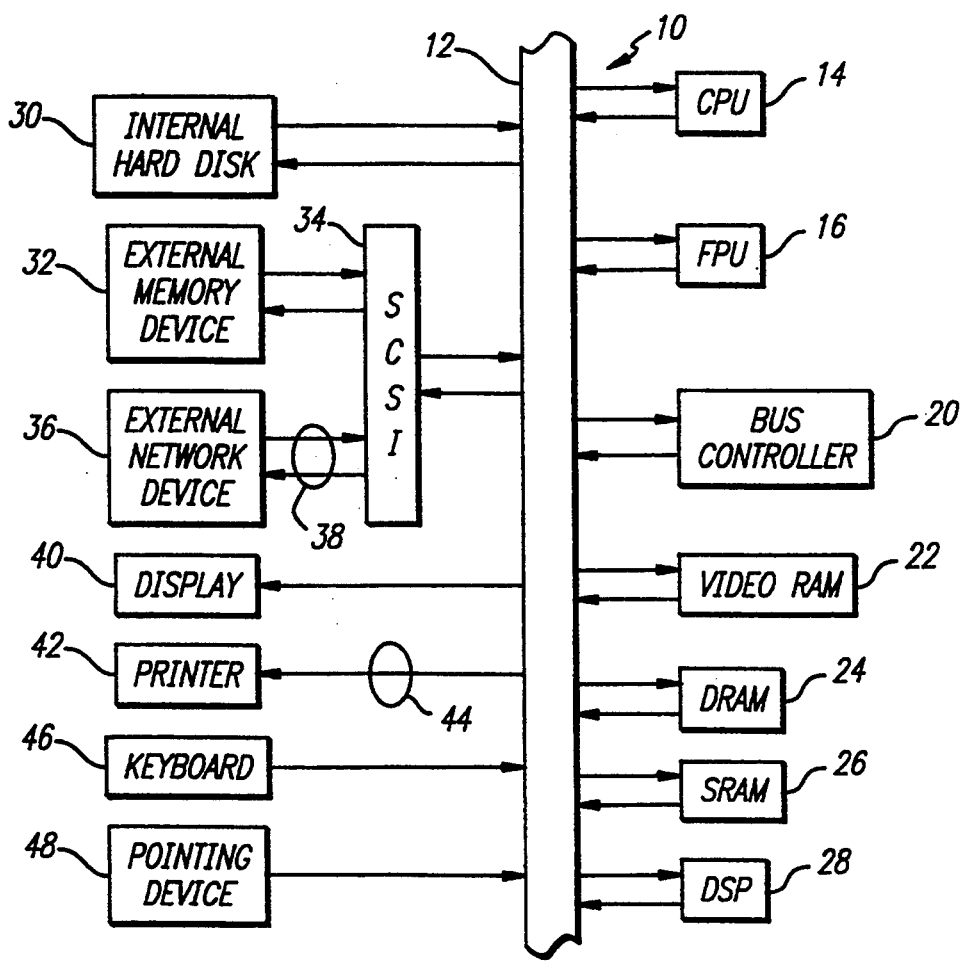
FIG. 1 is an illustration of the general computer architecture of a system within which the present invention may operate.

With regard to FIG. 1, there is shown therein the general architecture 10 of a system of the type within which the present invention operates. Architecture 10 comprises a main bus 12, which serves to interconnect various components, including at least some of the following (and possibly other additional components): Central Processing Unit (CPU) 14, Floating Point Unit (FPU) 16, Bus Controller 20, Video RAM 22, Dynamic RAM (DRAM) 24, Static RAM (SRAM) 26, Digital Signal Processor (DSP) 28, Internal Hard Disk 30, External Memory Device 32 (connected for example via a SCSI port 34), External Network Devices 36 (communicating for example over an Ethernet Network 38, and connected via SCSI port 34), Display Device 40 (such as a CRT), Printer 42 (such as a PostScript device connected for example via a serial port 44), Keyboard 46, and Pointing Device 48 (such as a mouse, trackball, etc.) The interconnection and functioning of each of these components in an operating computer system are well known in the art. However, the function and significance of particular components will be discussed in further detail where appropriate.

While the discussion that follows describes the invention in terms of the software programming environment known commonly as object oriented software design, it will be appreciated that the functionality of the present invention is not limited to such environments. However, as support for one possible environment in which the present invention operates, a description of certain relevant details of object oriented programming environments is presented.

In an object oriented programming language, the fundamental data structures of the language are objects, programming elements that contain a specification of both data and actions. Data are specified in local variables, referred to as instance variables, contained within the object. Actions, or methods, are subprograms that operate on the variables. Methods are invoked by messages sent from one object to itself or other objects.

There are two fundamental object constructs: classes and instances. Classes have a set of variables and methods and can be thought of as templates for object types. Instances (or objects) are particular run-time instantiations of a class. An object provides storage for variables defined in its class. Each instance has its own version of those variables. When a message is sent to an object, the object looks to methods defined in its class to determine how the message is to be executed.

Classes are defined in terms of a class hierarchy. A class inherits all variables and methods from classes higher in the hierarchy, referred to as superclasses. The inheriting class may be referred to as a subclass or child of the superclass. The variables and methods inherited from a superclass are available to the inheriting class as if they were defined within the inheriting class. Note that if a subclass has multiple superclasses, all the variables and methods from each superclass are inherited. This is often referred to as multiple inheritance.

There are two types of variables that may be defined within a class. The first are class variables, whose storage is shared by all instances of the defining class. Class variables are typically used for coordination between classes and instances. The second are instance variables, which are variables specific to each particular instance.

That is, separate storage space is allocated for each instance variable of each instance.

Methods specify the action to be performed when a message is sent to an object. When the message is sent to an object, the message name is matched against method names defined for that object. The method actually executed is the method with the same name as the message that is defined lowest in that object's class hierarchy.

Messages can have parameters. When a message is sent, all actual parameters are fully evaluated before a method is located for that message. Methods have formal parameters, corresponding to the actual parameters in the message, and temporary variables. Temporary variables may be created when a message is executed, and are available only with the scope of that method while the method is executing.

Programs perform by sending messages to objects which invoke a method in an object's class or class hierarchy. Often, methods send messages to other objects, invoking other methods. Typically. each method returns a result to the sender. At the heart of many languages, and especially an object oriented language, is a program segment for interpreting and evaluating messages and keeping track of where to return when methods call other methods.

Object oriented programming environments can be implemented with many programming languages. One common example of an object oriented environment is the C++ environment, described in further detail in Ellis, Margaret and Bjarne Stroustrup, THE ANNOTATED C++ REFERENCE MANUAL (Addison-Wesley 1990) and Coplien, James O., ADVANCED C++ PROGRAMMING STYLES AND IDIOMS (Addison-Wesley 1992).

Figure 2:
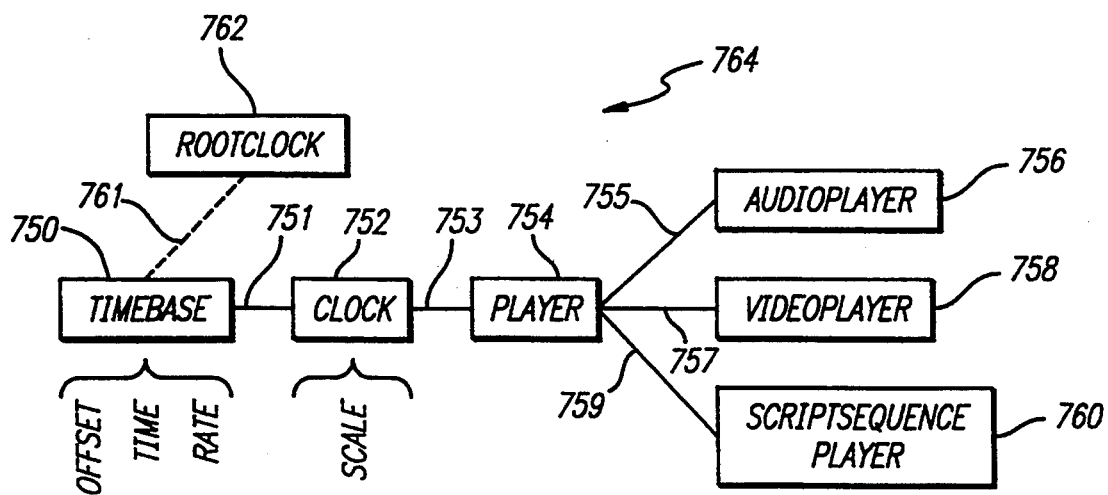
FIG. 2 is an illustration of an exemplary class hierarchy of various classes according to one embodiment of the present invention.

With regard to FIG. 2, there is shown therein an illustration of the class hierarchy 764 of various classes according to one embodiment of the present invention. FIG. 2 illustrates the inheritance relationship between the various classes of hierarchy 764. For example, Timebase class 750 is the base class from which Clock class 752 inherits, as shown by the line 751 connecting Timebase class 750 and Clock class 752. Player class 754 inherits from Clock class 752 as illustrated by line 753. AudioPlayer class 756, VideoPlayer class 758, and ScriptSequencePlayer class 760 inherit from Player class 754, as illustrated by lines 755, 757, and 759, respectively. Initially, these classes will be described, followed by an example of their usage.

Shown in FIG. 2 is the relationship between the Timebase class 750 and a RootClock class 762. An instance of RootClock 762 (i.e., a RootClock object) can be comprised of both a hardware portion, and a software portion discussed in detail below. Each instance of the classes of hierarchy 764 must be synchronized directly or indirectly to a RootClock. Each object gets its time from an object which either directly or indirectly gets time from a RootClock. Hence, Timebase class 750 includes a method for getting time from the RootClock.

The hardware clock portion of a RootClock object may be, for example, a hardware device that emits ticks at a specific rate together with a register which keeps track of those ticks, as discussed above. There is only a single RootClock object which represents that hardware device. That is, a RootClock represents a hardware timing resource. However, there may be within a single system multiple hardware timing resources, and thus multiple RootClocks, one for each hardware timing resource.

As illustrated in FIG. 2, Timebase object 750 is the top-level class of hierarchy 764. When a Clock object, a Player object, an AudioPlayer, VideoPlayer, or ScriptSequencePlayer object is instantiated, it includes all methods and variables inherited from the Timebase class 750. This motivates the lexical statement that a Clock "is a" Timebase. The class methods for the Timebase class 750 are listed in Appendix 1. The instance methods for the Timebase class 750 are listed in Appendix 2.

A Clock object (an instance of Clock class 752) is principally capable of returning the time (hence the motivation for its name). A Clock object records time by keeping track of the offset between itself and its master clock. When a Clock object receives a request for the time, it gets the time of the master clock, subtracts the offset, and returns the result.

Each Clock object has associated with it a time scale that defines the number of time units that pass each second (when rate is 1). Therefore, a Clock object that has a time scale of 1 measures time in seconds. Similarly, a Clock object that has a time scale of 60 measures sixtieths of a second.

A particular point in time in a Clock object is represented by a time value. A time value is expressed in the time scale of the Clock object. For example, for a Clock with a time scale of 60, a time value of 180 translates into 3 seconds of elapsed time. The rate of a Clock object is the speed at which time passes for that object. Thus, the absolute value of a time unit in seconds depends on both the rate and scale of the Clock object. The number of time units that pass each second for a Clock object can be determined by multiplying its rate by its scale. The present time in seconds in the playing of a media may be determined as follows:

$$\text{Time in seconds} = \frac{\text{time value}}{\text{scale} \times \text{rate}}$$

Figure 3:
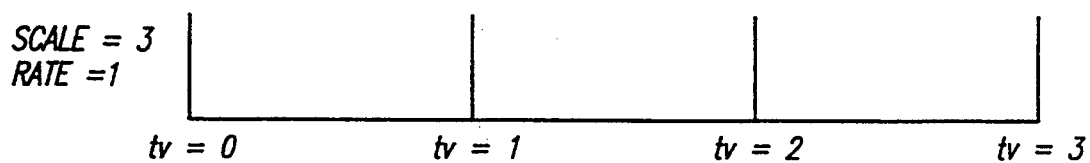
FIG. 3 is an illustration of rates, scales, and time values.
Figure 3:
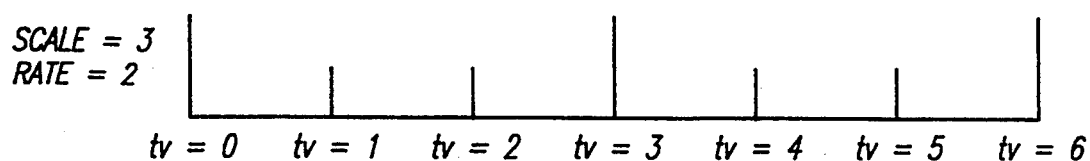
Figure 3:
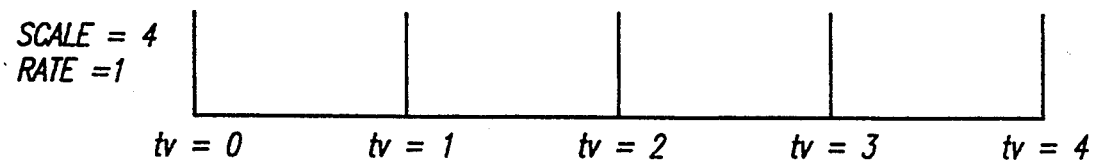
Figure 3:
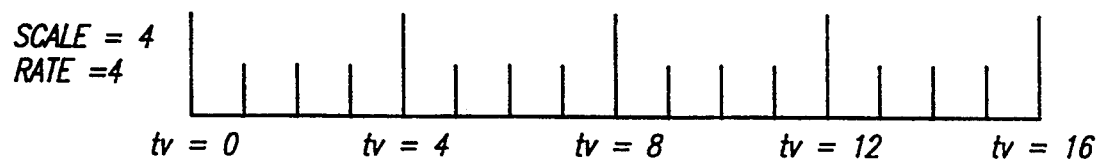
Figure 3:
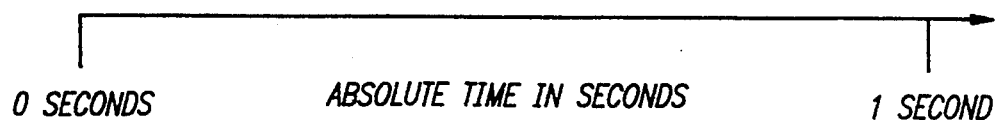

Rates, time scales and time values are illustrated in FIG. 3.

Instances of Clock class 752 may be created for the purpose of establishing a time source which does not play media. Instances of the AudioPlayer class 756, VideoPlayer class 758, and ScriptSequencePlayer class 760 may be created to obtain a time source which also plays specific media, as described below. A prototype for the method called on Clock class 752 to create a Clock object is as follows:

| method object | |
|---|---|
| new (class | self |
| object | master |
| object | scale) |

The arguments of this method are:

| | |
|---|---|
| self | The class to be instantiated, which in this case is Clock. |
| master | The master clock to which the new clock is to be synchronized. If it is passed as NULL, the clock is synchronized to a RootClock. |
| scale | The scale for the clock. |

An example of this method is:

myclock=new(Clock, Null, 60);

which creates a new Clock object synchronized to a default hardware clock, with a scale of 60.

The Clock class 752 inherits all of the methods and variables from the Timebase class 750. For example, the following methods inherited frown the Timebase class 750 may be useful to Clock objects (see Table 2 for further descriptions of these methods):

getRate
setRate
getEffectiveRate
getFlags
setFlags
getMasterClock
setMasterClock
getMasterRootClock
getRootClock
Servicing CallBacks Timebase class 750 does not, however, provide time scales. The Clock class 752 provides methods for getting and setting time scales. Furthermore, Clock class 752 provides methods for getting and setting its own time. Appendix 3 lists the methods that are introduced by the Clock class 752.

The Player class 754 provides methods for playing media. Specifically, a Player object is responsible for facilitating the data transfer between a media stream object (representing, for example, digitally captured audio or video) and a media system resource (e.g., drivers for audio or video presentation devices that convert digital data to analog sound or images). Such protocols include the information necessary to interpret the data stream. For example, an AudioPlayer object would be responsible for determining that an audio channel driver object (the methods for which are listed in Appendix 8) is capable of processing the data at an appropriate rate—e.g., one corresponding to the sampling rate for a particular audio media stream. In this way, a Player object may assist in the identification and selection of an appropriate system resource for a particular data stream.

The Player class 754 defines a protocol which is generic for all players. Thus, a Player object may also be employed as a high level controller of AudioPlayer, VideoPlayer, or ScriptSequencePlayer objects synchronized to that Player object.

One key aspect of the present invention is that Player objects are also Clock objects (or in the parlance, a Player "is a" Clock). Therefore, Player objects themselves contain methods involving time, such as methods for controlling the start and stop time, setting rate of play, etc.

While the Player class 754 contains general methods common to all players, each of the specific player subclasses, AudioPlayer class 756, VideoPlayer class 758, and ScriptSequencePlayer class 760, contains methods that are specific to its associated media. For example, AudioPlayer class 756 will contain methods for adjusting the play volume, etc., in addition to methods for controlling the start and stop time, setting rate of play, etc. Appendix 5 presents a detailed discussion of a number of specific Player subclasses.

Since synchronization causes the time, rate, and offset of an object to be relative to another object (or to the hardware clock), notice of a change in any of these values must be passed to all interested objects. That is, if a particular Player object is synchronized to a Clock object, its effective rate is a function of the rate of the Clock object.

Figure 4:
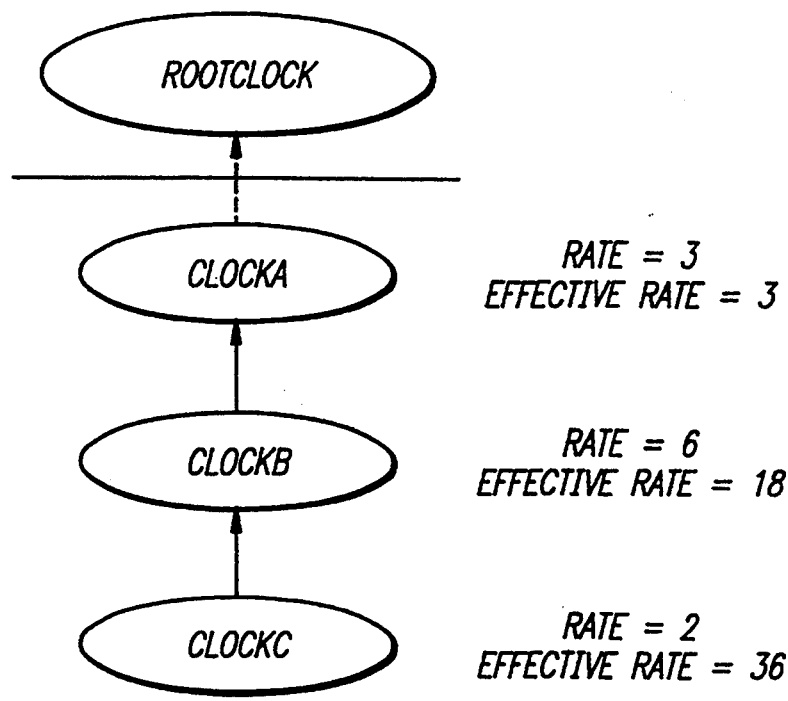
FIG. 4 is an illustration of effective rates.

For example, suppose a Clock object called ClockC, whose rate is 2, is synchronized to a Clock object called ClockB, whose rate is 6, which in turn is synchronized to a Clock object called ClockA, whose rate is 3 as synchronized to the hardware clock. As illustrated in FIG. 4, ClockA's effective rate is 3, ClockB's effective rate is 18, and ClockC's effective rate is 36. Thus, if the rate of a Clock object changes, all objects synchronized to that object must be notified of the change. This notification is handled by CallBack objects.

Figure 5:
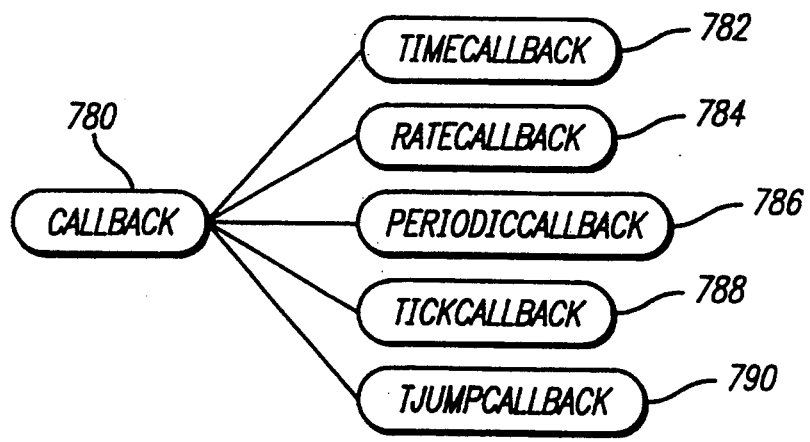
FIG. 5 is an illustration of the subclasses of the CallBack class according to one embodiment of the present invention.

CallBack objects may also be used in conjunction with a Clock object to schedule the occurrence of activities at particular times. For example, a Player could be scheduled to start playing at a particular time. Thus, to schedule an activity, a CallBack object is created and associated with a Clock object. As illustrated in FIG. 5, the CallBack class 780 has the following subclasses:
TimeCallBack class 782

These CallBacks are activated at a certain time.

For example, a CallBack may be used to start a player at a particular time.
RateCallBack class 784

These CallBacks are activated when the rate changes.

For example, a CallBack may be used to alter the display when a media is in fast forward mode.
PeriodicCallBack class 786

These CallBacks are activated repeatedly at regular intervals.

For example, during the playback of a movie, a CallBack could be used to display the name of the producer every five seconds for the first minute of playback.
TickCallBack class 788

These CallBacks are similar to PeriodicCallBacks, but such a

CallBack always executes once per RootClock tick (or resolution).
TJumpCallBack class 790

These CallBacks are activated when there is a jump in time.

For example, during the playing of an animation sequence, if the time is reset, a CallBack could be used to do certain housekeeping functions to reset the animation.

CallBack objects are created by first ensuring that the clock which it will be attached to exists. Next, a new CallBack object is created by calling the new method on the appropriate CallBack subclass. In creating the new CallBack object, the clock which it will be attached to is specified. A function is then specified, with a single argument of type void*, for the CallBack to perform. The callMeWhen method of the CallBack object is used to specify when the CallBack is to be activated. The prototype for

| callMeWhen is: | | |
|---|---|---|
| method void | | |
| callMeWhen( | object | self, |
| | CallBackProc | CallBackProc, |
| | void | *CallBackParam, |
| | long | flags, |
| | long | rateORline, |
| | TimeRecord | *timerecord, |
| | CallBackPriority | queueID) |

The arguments of callMeWhen are:

| | |
|---|---|
| self | The CallBack |
| CallBackProc | The procedure that defines what the CallBack does |
| CallBackParam | The argument of type *void for CallBackProc. |
| flags | This flag can be one of the following, which have all been defined as type long:<br>triggerTimeFwd<br>    The CallBack will be triggered at a given time when the rate is positive (that is, going forward.)<br>    This only applies to TimeCallBacks.<br>triggerTimeBwd<br>    The CallBack will be triggered at a given time when the rate is negative (that is, going backward.) This only applies to TimeCallBacks.<br>triggerTimeEither<br>    The CallBack will be triggered at a given time when the rate is either positive or negative.<br>    This only applies to TimeCallBacks.<br>triggerRateLT<br>    The CallBack will be triggered when the rate is less than a given value. This only applies to RateCallBacks.<br>triggerRateGT<br>    The CallBack will be triggered when the rate is greater than a given value. This only applies to RateCallBacks.<br>triggerRateEqual<br>    The CallBack will be triggered when the rate is equal to a given value. This only applies to RateCallBacks.<br>triggerRateLTE<br>    The CallBack will be triggered when the rate is less than or equal to a given value. This only applies to RateCallBacks.<br>triggerRateGTE<br>    The CallBack will be triggered when the rate is greater than or equal to a given value. This only applies to RateCallBacks.<br>triggerRateNotEqual<br>    The CallBack will be triggered when the rate is not equal to a given value. This only applies to RateCallBacks.<br>triggerRateChange<br>    The CallBack will be triggered when the rate changes. This only applies to RateCallBacks.<br>none/0/null<br>    For TJumpCallBacks, TickCallBacks and PeriodicCallBacks. |
| rateORline | This applies to RateCallBacks only. For other types of CallBacks, pass this as NULL.<br>The specified rate is the critical rate that determines when the CallBack is invoked. For example, if the flag is triggerRateGTE, and the rateORline is 10, the CallBack will be triggered any time the rate is 10 or greater.<br>The line value is used for display-based clocks where you might be able to interrupt on a particular scan-line. |
| timerecord | This applies only to TimeCallBacks and PeriodicCallBacks. For other types of CallBacks, pass this as NULL. The time value is a 64 bit integer, which must be addressed as two longs (in most programming languages). This is the time record that indicates the time at which the CallBack is to be activated for TimeCallBacks, and the time period between activations for PeriodicCallBacks. |
| CallBackPriority | This can be one of the following:<br>    lowCallBackPriority<br>    medCallBackPriority<br>    highCallBackPriority<br>The priority value is used to help resolve conflicts when multiple CallBacks are scheduled to go off at the same time, (but there is no absolute guarantee about what order they will go off in.) The priority also affects the responsiveness of the CallBack: the higher the priority, the closer to the right time that the CallBack will be executed. |

For example, suppose a user desires to create a CallBack to start a given player playing at time 10. The following example shows the code for the CallBack procedure StartPlay, which starts a player playing. It then shows a function SetCallBackToGo that sets the time and procedure for the CallBack, then attaches the CallBack to a given player.

```
void
StartPlay (void *value)
{
    object player = (object) value;
    play (player);
}
void SetCallBackToGo(object player, long startTime);
{
    object        callback = new(TimeCallBack, player);
    TimeRecord    timerecord;
    timerecord-value-high = 0;
    timerecord-value-low = startTime;
    timerecord-scale=1
    callMeWhen (    callback,
                    StartPlay,
                    player,
                    triggerTimeFwd,
                    0,
                    &timerecord,
                    highCallBackPriority);
}
```

The CallBack class is an abstract class, so the user does not typically create instances of it. Instead, a user would create an instance of the appropriate subclass (TimeCallBack, RateCallBack, PeriodicCallBack, TickCallBack, and TJumpCallBack). Each of these subclasses has a "new" method with the following prototype:

method object<br>
    new (object self, object clock)<br>
where the arguments are:

| | |
|---|---|
| self | is one of TimeCallBack, PeriodicCallBack, RateCallBack, TJumpCallBack and TickCallBack depending on what type of CallBack you want. |
| clock | is the clock to which to attach the CallBack. |

Finally, Appendix 6 lists the instance methods of the CallBack subclasses.

Figure 6:
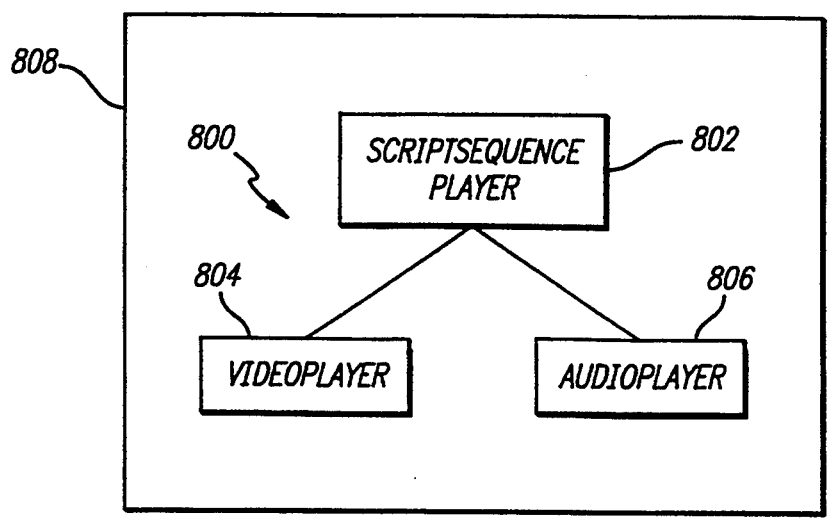
FIG. 6 is an illustration of a network of media players, hierarchically arranged, according to one embodiment of the present invention, for the "playing" of a multimedia title.

With regard now to FIG. 6, there is shown therein a network 800 of media player objects, hierarchically arranged, according to one embodiment of the present invention, for the "playing" of a multimedia title. The hierarchy indicates the master-slave relationship between these player objects. The network 800 of FIG. 6 will be used in the following example to illustrate various aspects and features of the present invention. Initially, each of the players must be created. This step may be performed by invoking the "new" method on each of the subclasses ScriptSequencePlayer, AudioPlayer, and VideoPlayer. The "new" method for each of these particular subclasses is described in detail in Appendix 5.

Each of the player objects must be associated with an existing data stream object, the playing of which is controlled by the player object. (Appendix 7 contains a list of methods for an Audio Stream object, as an example of methods for such data stream objects.) Creation and storage of digitized streams of audio, video and other media data is well known in the art. The data stream objects are associated with the player objects by way of the arguments of the "new" method. Specifically, this results in the creation of ScriptSequencePlayer object 802, VideoPlayer object 804, and AudioPlayer object 806, within the context of computer 808. These objects must next be associated with one another, for example to establish the relative timing among them, for the purpose of playing the title.

Figure 7:
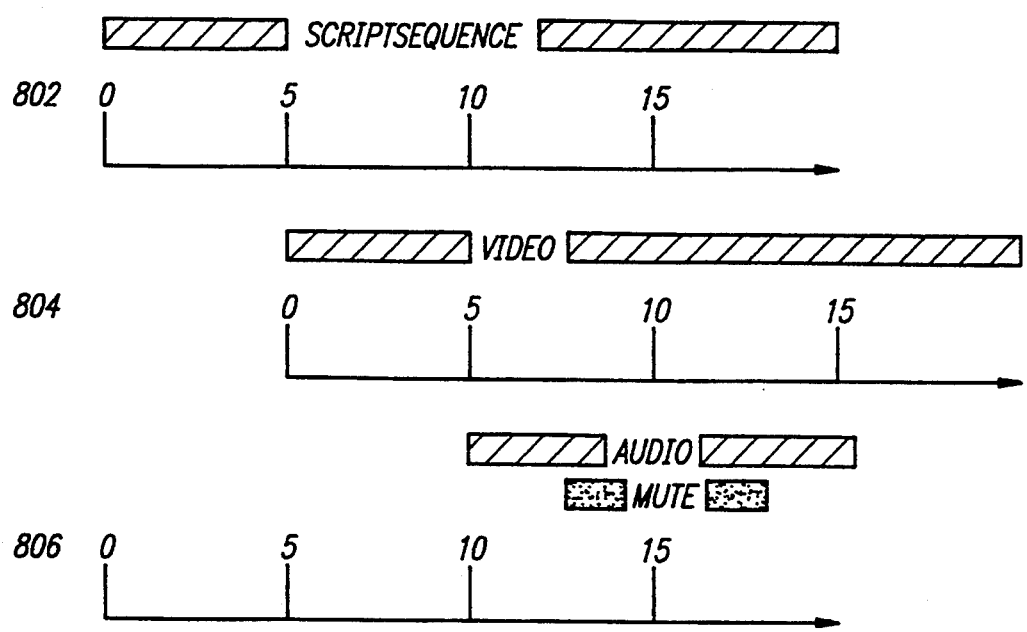
FIG. 7 is an illustration of a synchronization scheme for the playing of a multimedia title by the network of media players illustrated in FIG. 6.

FIG. 7 illustrates a synchronization scheme by which network 800 may play a title. The ScriptSequencePlayer 802 begins playing animation. Its master clock is the RootClock.

The VideoPlayer 804 has its master clock set to the ScriptSequencePlayer 802. This may be accomplished by the setMasterClock method (Appendix 2). After 5 units of the ScriptSequencePlayer's time have passed, the VideoPlayer 804 begins playing a video data stream at its own time 0. This is established by the setScaledClockZero method (Appendix 2). Thus, the VideoPlayer 804 has an "offset" of 5. That is, its "0" time is 5 units after the "0" time of its master clock (in the master clock's units). Furthermore, the VideoPlayer's origin is at 0. That is, the VideoPlayer begins playing at its own time 0.

The AudioPlayer 806 also has its master clock set to the ScriptSequencePlayer 802. After 10 units of the ScriptSequencePlayer's time has passed, the AudioPlayer 806 begins playing an audio data stream. However, the start of the AudioPlayer's time corresponds to the start of the ScriptSequencePlayer's time. Thus, the AudioPlayer has an offset of 0, with its origin at 10 (by invoking the setOrigin method). Importantly, it is the fact that each player inherits the Clock class methods (i.e., a player is a clock) which allow a player to have its master clock set to another player—it is not necessary to separately address clock objects.

A player hierarchy has thereby been established, with the players associated with data stream objects and with the various players synchronized. The play method may then be invoked on the ScriptSequencePlayer. This results in setting the rate of the ScriptSequencePlayer to 1.0 (wherein, a rate of 1.0 corresponds to "play," a rate of 0.0 corresponds to "stop," a rate of −1.0 corresponds to play in reverse, a rate of 0.5 corresponds to play at half speed, etc.)

Each Player object, by way of methods inherited from the Timebase class, maintains a list of CallBacks which contain objects to be called and the event upon which they are to be called, A player which is "interested" in (e.g., affected by) a time or rate change, overrides the timeChanged or rateChanged methods of the superclass. When the setTime or setRate methods are called, any CallBacks associated with a time change or rate change are dispatched, respectively. In addition, a Player issues a timeChanged or rateChanged message directly to itself and all players synchronized to it. Within the timeChanged or rateChanaged method, if it is determined that the player is approaching a time at which it is to play, it registers a TimeCallBack with itself. This TimeCallBack will dispatch a play message at the appropriate time. If it is determined by the player that it is at a time at which it should play, no CallBack is registered, and play is invoked immediately.

Due to the rate being changed on ScriptSequencePlayer 802, a rateChanged method is called on each of the slaved players, VideoPlayer 804 and AudioPlayer 806. This results in CallBacks being scheduled, as discussed above. The first TimeCallBack is set for VideoPlayer 804 at time 5 of ScriptSequencePlayer 802, and the second is set for AudioPlayer 806 at time 10 of ScriptSequencePlayer 802. Upon determining that time 5 has been reached, the RootClock sends a play message to VideoPlayer 804 via the CallBack. Likewise, the play method of AudioPlayer 806 is invoked upon reaching time 10.

It will be appreciated that setting the time for the CallBack is a function of the application environment in which the present invention is operating. That is, in the above example it may be desirable or required to set a CallBack to occur before the media is actually to play, for the purpose of preparing the player, hardware, etc.

As a first variation on the above example, suppose it is desirable to silence the AudioPlayer 806 for a portion of its play time, but keep its time running for later play (as opposed to a pause in the playback). This may be accomplished by turning AudioPlayer 806 off and then on again, but this would require the additional steps of maintaining the duration of the off-time, calculating the on-time, and a setting the time to that on-time. A simpler mechanism for accomplishing this, and one more in keeping with the hardware player analog, is to provide a mute feature. The mute feature may be scheduled via a CallBack. This mute feature allows a player to continue to count time, while silencing its output. FIG. 7 shows AudioPlayer 806 muted from its time 13 to its time 16.

As a second variation on the above example, assume that it is desired to go to a particular time on the script sequence of network 800 and begin playing. This is accomplished by the setTime method of the ScriptSequencePlayer 802 (Appendix 3). Specifically, suppose that in the play of the script sequence, an event occurs which causes the play of the script sequence to return to its time 5 (for example, a user pushes a button that caused this command to be sent to the script sequence). The result is that the VideoPlayer 804 and AudioPlayer 806 receive a timeChanged message from the ScriptSequencePlayer 802 indicating that time has been changed, and the players accommodate the message as discussed above (e.g., VideoPlayer 804 starts at its time 0, and AudioPlayer 806 starts at its time 5). It will be appreciated that again it is the inheritance hierarchy (i.e., a player "is a" clock) which facilitates this simple compensation for time changes.

Figure 8:
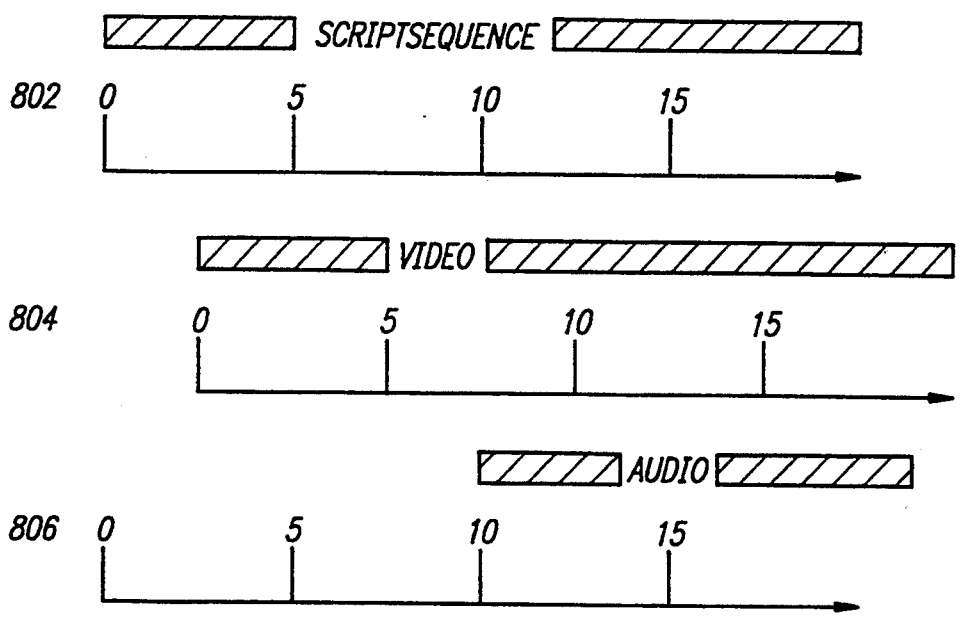
FIG. 8 is an illustration of a variation of the synchronization scheme for playing a multimedia title of FIG. 7.

As another variation of the above-described example, suppose it is desirable to go to a particular time of the video playback, independently of the ScriptSequencePlayer. That is, it is desired to alter the synchronization between the video and script playback. This may be accomplished by invoking the setTime method of VideoPlayer 804. Specifically, suppose that when time 12 in the ScriptSequencePlayer's time is reached, VideoPlayer 804 receives a call to set its own time to 10, essentially skipping forward. This is shown graphically in FIG. 8. The result of this call is to change the offset of VideoPlayer 804 relative to ScriptSequencePlayer 802 from 5 to 2. It should be noted that the change only affects VideoPlayer 804; ScriptSequencePlayer 802 and AudioPlayer 806 are unaffected by the change.

Figure 9:
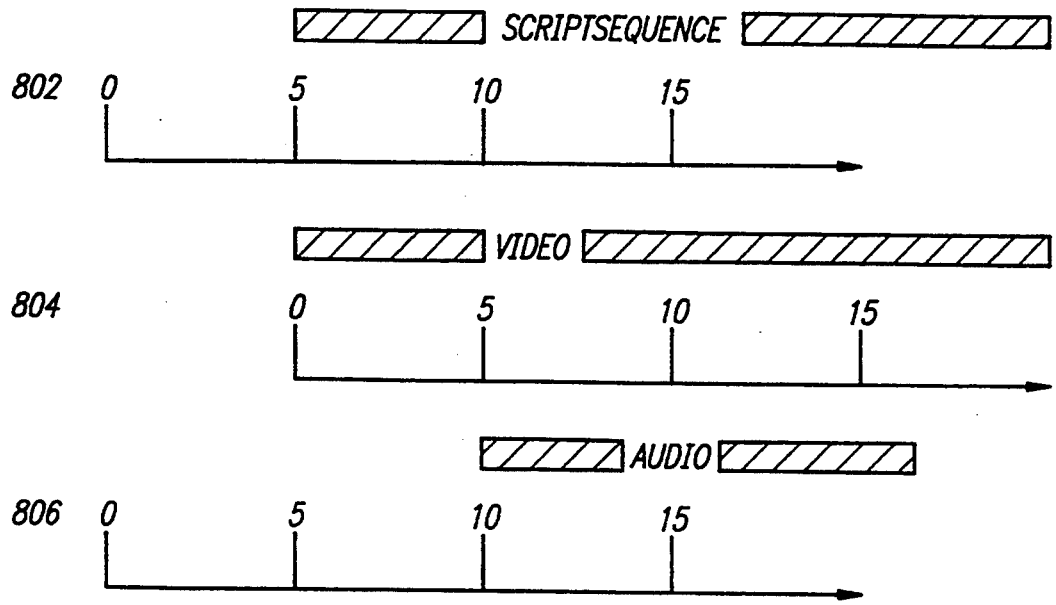
FIG. 9 is also an illustration of a variation of the synchronization scheme for playing a multimedia title of FIG. 7.

As yet another variation on the above example, suppose that it is desired to change the start time of the animation played by the ScriptSequencePlayer 802, yet leave the synchronization relationships between the players unchanged. For example, suppose that it is desired that the script sequence start playing at its own time 5, coincident with the start of VideoPlayer 804, while the point in time at which its clock starts remains unchanged. This may be accomplished by invoking the setOrigin function for ScriptSequencePlayer 802 to set the origin to 5. Notice that changing origin has no effect on offset, as shown in FIG. 9.

As still another variation of the example discussed above, assume that it is desirable to play the script sequence at an accelerated rate, for example to double its rate of play. This may be accomplished by invoking the setRate method (Appendix 2) on ScriptSequencePlayer 802. The net effect of this method is to double the rate of play of ScriptSequencePlayer 802. Importantly, the result of doubling the rate of ScriptSequencePlayer 802 is also to double the rates of play of the clocks (and thus) players slaved to it, namely VideoPlayer 804 and AudioPlayer 806. This simple method for coordinating modifications to a master clock is, once again, facilitated by the inheritance of clock methods by a player object (i.e., a player is a clock).

As previously mentioned, CallBack objects associated with Timebase objects are registered with the RootClock of the Timebase object. These CallBack objects are maintained in a time-ordered list in the Root-Clock. CallBack objects can be registered according to (i.e., an object may request notification of setting or changes to) time or rate.

CallBacks which return a message at a particular time must be scheduled differently. The time of the CallBack is specified in the scale of the associated Clock. This time is converted to the scale of the RootClock, added to the current tick count of the counter, and inserted in the time-ordered list in the RootClock. The manner in which the RootClock object determines when to dispatch a CallBack will now be discussed.

With regard to the hardware portion of the Root-Clock 762 to which timebases must ultimately be synchronized, most computer systems rely on the only readily available and feasible constant hardware tick— the vertical synchronization signal (VBL), which typically oscillates at 60 Hertz. A software counter is generally employed to maintain a count of ticks, e.g., in a 64-bit integer. In this manner, the system is interrupted every 1/60 second, whereupon the software counter is incremented.

Yet, in multimedia applications, the resolution of 1/60 second is not sufficient. For example, the standard sound sampling rate is 44.1 KHz. Thus, there are 735 samples between each tick. Accessing a precise one of the 735 samples is impossible with a 60 Hz clock. However, few (if any) computer platforms are capable of sustaining interrupts at a rate of 44.1 KHz.

The consequence is that existing systems either accept this lack of precise synchronization or attempt to use a faster clock (e.g., a 25 MHz system clock to which their software clocks are not synchronized) to estimate the desired time. In either case, the result is less than accurate synchronization.

According to one embodiment of the present invention, the players (and thus clocks) in the network hierarchy of FIG. 6 are ultimately synchronized to a root clock which operates at 44.1 KHz (the rate of the fastest media in the system—CD-quality audio—which can be converted to the slower rates of other media, such as the 30 frames/second of full motion video). In this manner, precise synchronization to any sample of CD-quality audio or virtually any other media can be obtained.

To avoid overloading the system with frequent interrupts as noted above, the RootClock object to which ScriptSequencePlayer 802 is synchronized is provided with a 16-bit hardware counter portion which generates an interrupt when it wraps around (overflows), approximately once every 1.5 seconds, and a 48 bit software counter portion. The interrupt signal from the Root-Clock's 16-bit hardware counter portion is used to increment its 48 bit software counter portion. Thus, together these hardware and software portions of the RootClock form a 64-bit hardware/software root clock operating at 44.1 KHz.

In addition, the RootClock is provided with one or more 16 bit compare registers used for low order bit comparisons of CallBacks. For each increment of the software counter, the first CallBack in the time-ordered list is checked. To determine if a CallBack should be scheduled the current value of the 64 bit RootClock counter is subtracted from the 64 bit CallBack value. If the result of the subtraction is less than the bit-resolution of the hardware counter (i.e., 65,536 for 16 bits) then the low-order 16 bits of the CallBack's value are placed in the hardware compare register (unless the result is less than or equal to zero, in which case the CallBack is immediately dispatched). If the result of the subtraction is greater than the bit resolution of the hardware counter, then the hardware counter is allowed to roll-over, and the subtraction is performed again. When the low-order 16 bits of the CallBack's value are latched into the hardware compare register, the CallBack interrupt is enabled.

When the 16-bit hardware counter equals the value in the compare register, the CallBack interrupt is generated. The RootClock disables the interrupt and dispatches the CallBack (as discussed above). As well understood by those skilled in the art, this dispatch may come in the form of enabling a task to handle the CallBack, since interrupt routines should be minimized where possible.

In general, to those skilled in the art to which this invention relates, many changes in construction and widely differing embodiments and applications of the present invention will suggest themselves without departing from its spirit and scope. For example, players other than those discussed above may be employed in hierarchies of the type illustrated herein. Thus, the disclosures and descriptions herein are illustrative, and are not intended and should not be read to be in any sense limiting.

Appendix 1

The methods for the Timebase class generally take arguments of type TimeValue, TimeScale, and TimeRecord. Definitions for these data types are as follows:

```
typedef long              TimeValue;
typedef unsigned long     TimeScale;
typedef KDoubleLong       CompTimeValue;
typedef struct TimeRecord
{
```

-continued

```
    CompTimeValue    value;        /*units*/
    TimeScale        scale;        /*units per second*/
    object           timebase;     /*usually TimeBase*/
}
TimeRecord;
```

Timebase Class Methods

| Name | Type | Argument Type | Argument | Description |
|---|---|---|---|---|
| new | object | class | self | Creates a new instance of the class, initializing all the instance variables. |
| convertTimeScale | void | class | self | Converts a time from one time scale to another. |
|  |  | TimeRecord | *timerec |  |
|  |  | TimeScale | scale | Specify the time to be converted in a time record. |
| addTime | void | class | self | Adds two times together. |
|  |  | TimeRecord | *dst | Specify the times in time records. |
|  |  | TimeRecord | *src | If these times are relative to different time scales or clocks, the addTime method converts the times as appropriate to yield reasonable results. However, the clocks for both time values must rely on the same time source. |
| subtractTime | void | class | self | Subtracts one time from another. |
|  |  | TimeRecord | *dst | Specify the times in time records. |
|  |  | TimeRecord | *src | If these times are relative to different time scales or clocks, the subtractTime method converts the times as appropriate to yield reasonable results. However, the clocks for both time values must rely on the same time source. |

Appendix 2
Timebase Instance Methods

| Name | Type | Argument Type | Argument | Description |
|---|---|---|---|---|
| convertScaledTime | void | object | self | Converts a time into a time that is relative to this clock. Specify the time to be converted in a time record. |
|  |  | TimeRecord | *timerec |  |
| getScaledTime | TimeValue | object | self | Returns the clock's current time in the scale specified by scale. Timerec is either a pointer to a TimeRecord, or NULL. If no TimeRecord is specified, then the time is returned as a TimeValue (which is a long). If the time |
|  |  | TimeScale | scale |  |
|  |  | TimeRecord | *timerec |  |

-continued

| Name | Type | Argument Type | Argument | Description |
|---|---|---|---|---|
| | | | | value is greater than can be specified in a long, the returned value is set to the largest value that a long can hold. If a TimeRecord is specified, then additionally the time field is filled in with the clock's time value as a KDoubleLong. |
| setScaledTime | void | object | self | Sets the current time of a clock to the time specified in the time record and in the scale specified in the time record. If the current time of a clock that is the master clock for other clocks is set, the current times in all the slave clocks are changed appropriately. If the current time in a clock that relies on a master clock is changed, it changes the offset between the clock and the master clock-the master clock is not affected. |
| | | TimeRecord | *t | |
| setScaledValue | void | object | self | Sets the current time of a clock in the given time scale. Specify the new time as a time value. If the current time of a clock that is the master clock for other clocks is set, the current times in all the slave clocks are changed appropriately. If the current time in a clock that relies on a master clock is changed, it changes the offset between the clock and the master clock-the master clock is not affected. |
| | | TimeValue | time | |
| | | TimeScale | scale | |
| getRate | KFixed | object | self | Returns the rate of a clock. |
| setRate | void | object | self | Sets a clock's playback rate. Rates may be set to negative values. Negative rates cause time |
| | | KFixed | rate | |

| Name | Type | Argument Type | Argument | Description |
|---|---|---|---|---|
| | | | | to run backwards. |
| getEffectiveRate | KFixed | object | self | Retrieves the effective rate of a clock by taking into account the rates of all the clocks to which it is slaved. If it is not slaved to any other clocks, it returns the same result as getRate returns. |
| getFlags | long | object | self | Allows an application to obtain the contents of the control flags of a clock. The flags are listed in the description for setFlags below. |
| setFlags | void | object | self | Sets the contents of the looping |
| | | long | flag | control flags of a clock. The choices for flag are: (defined as longs) loopTimeBase Indicates whether the clock loops. If this flag is set to 1 and the rate is positive, the clock loops back and restarts from its start time when it reaches its stop time. If this flag is set to 1 and the rate is negative, the clock loops to its stop time. If the flag is set to 0 the clock stops when it reaches the end. palindromeLoop-TimeBase Indicates whether the clock loops. If this flag is set to 1, the clock loops back and forth between its start time and its stop time, regardless of the rate setting. If the flag is set to 0 the clock stops when it reaches the end. |
| getMasterClock | object | object | self | Returns the clock to which this clock is directly synced. Returns NULL pointer if it is directly synchronized to a hardware clock. |
| setMasterClock | void | object | self | Synchronizes |

-continued

| Name | Type | Argument Type | Argument | Description |
|---|---|---|---|---|
| | | object | clockTo-SyncTo | the clock to another clock. |
| getMasterRoot-Clock | object | object | self | Returns the hardware clock to which this clock (self) is directly synchronized. Will return NULL pointer if it is not directly synchronized to a hardware clock. |
| getRootClock | object | object | self | Gets the root hardware clock of a clock object, regardless of what its master clock is. For example, if ClockA is synchronized to ClockB which is synchronized to a hardware clock, ClockC, then a call to getRootClock on ClockA will return the hardware clock ClockC. |
| setScaledClockZero | void | object | self | Changes the offset from a |
| | | TimeRecord | *zero | clock to its master clock. The initial offset is established when a clock is assigned to its time source (use the setMasterClock procedure to assign a clock to a master clock). |
| getScaledStatus | long | object | self | Retrieves status information from a clock. |
| | | TimeRecord | *timerec | Returns flags that indicate whether the returned time value is outside the range of values specified by the start and stop times of the clock. This can happen when a clock relies on a master clock or when its time has reached the stop time. The following flags are defined: timeBaseBefore-StartTime Indicates that the time value represented by the contents of the time record referred to by the unpinnedTime parameter lies |

-continued

| Name | Type | Argument Type | Argument | Description |
|---|---|---|---|---|
| | | | | before the start time of the clock. This flag is set to 1 if the current time is before the start time of the clock. |
| append | void | object | self | Adds a CallBack object to the list |
| | | object | CallBack | for this clock. |
| deleteone | void | object | self | Removes a CallBack object |
| | | object | CallBack | from the list for this clock. |
| ServicingCall-backs | KBoolean | object | self | Returns true if the CallBacks associated with this clock are being rescheduled. |
| getMasterScale | long | object | self | Returns the scale of the master clock. |

Appendix 3
Clock Instance Methods

| Name | Type | Argument Type | Argument | Description |
|---|---|---|---|---|
| getScale | TimeScale | object | clock | Gets the scale of the clock. |
| setScale | void | object TimeScale | clock scale | Sets the scale of the clock. |
| getTime | TimeValue | object TimeValue | clock *time | Writes the name of the clock, in the clock's own time scale, into the timevalue. |
| setTime | void | object TimeValue | clock *time | Sets the time of the clock in the clock's own time scale. |

Appendix 4
Player Instance Methods

| Name | Type | Argument Type | Argument | Description |
|---|---|---|---|---|
| play | void | Player | self | Starts playing. |
| record | void | Player | self | Records if recording is possible. |
| stop | void | Player | self | Stops playing. |
| mediaEject | void | Player | self | Ejects if ejection is possible. |
| pause | void | Player | self | Sets the rate of the player to zero, but it is still prepared to continue. |
| getMuted | long | Player | self | Returns true (1) if the player has been muted, otherwise returns false (0). |
| setMuted | long | Player long | self muted | If MUTED is 1, sets the player to be muted. |
| playPrepare | void | Player | self | Prepares the player for the immediate playback. This means that hardware resources are allocated to this player. |
| playUnPrepare | void | player | self | Releases the hardware and software resources used by the player. |
| goToBegin | void | Player | self | Resets the time to 0. |

-continued

| Name | Type | Argument Type | Argument | Description |
|---|---|---|---|---|
| goToEnd | void | Player | self | Returns the time to duration (as returned by getDuration). |
| getDuration | Time-Value | Player TimeRecord | self *timeRec | Returns the current duration. |
| goToMarker | void | object TimeRecord | self index | Goes to the marker at the specified index. |
| setOrigin | void | Player | self | Sets the origin value of a player. |
| getOrigin | long | Player | self | Retrieves the origin value of a player. |

Playing Digitized Audio

To play a digitized sound, create an audio stream for the sound. Then create a DigitizedAudioPlayer, and specify the input stream. Then call the play method on the player.

For example, suppose that a Bento file contains the digitized sound of a whale spouting. This sound is identified as value 65574. The following function will play the sound of a spouting whale:

```
void
MyplayFn ()
{
  object mystream = new(AIFFStream, new(long 65574)) ;
  object myplayer = new(DigitalAudioPlayer, mystream);
  play(myplayer);
}
```

The CDAudioPlayer Class

NYI—Not yet implemented.

Use instances of the CDAudioPlayer class to play sound on CDs.

Instance Methods on Classes for Playing Audio

This section lists the instance methods on Audio-Player, followed by the additional instance methods on DigitalAudioPlayer, followed by the additional methods on CDAudioPlayer.

Instance Methods on AudioPlayer

AudioPlayer inherits methods that are generic to all players from Player and methods that are generic to all clocks from Clock.

The methods inherited from Player, which are

| | | |
|---|---|---|
| play | record | stop |
| mediaEject | pause | |
| getMuted | setMuted | |
| playPrepare | unPrepare | |
| goToBegin | goToEnd | getDuration |

The methods inherited from Clock that are relevant to Player objects,

| | |
|---|---|
| getScale | setScale |
| getTime | setTime |
| getRate | setRate |
| getEffective-Rate | |
| getFlags | setFlags |
| getMasterClock | setMasterClock |
| getRootClock | getMasterRootClock |
| servicingCallbacks | |

The additional methods in AudioPlayer that are specific to playing audio are listed below.

| Name | Type | Argument Type/Class | Argument | Description |
|---|---|---|---|---|
| setGain | void | AudioPlayer | self | Sets the gain (volume) of the player. The gain value is |
| | | long | gain | between 0 and $2^{16}-1$ where 0 means no sound and $2^{16}-1$ means the loudest that can be played. |
| getGain | long | AudioPlayer | self | Gets the gain (volume) value of the player. |
| setPan | void | AudioPlayer | self | Sets the pan (balance) for the sound that the player controls. |
| | | long | pan | The value is between 0 and $2^{16}-1$. 0 means the sound is all the way to the left, and the maximum value means it is all the way to the right. (You can use the constant kUnityGain for the midway point at which the sound is equally balanced between left and right. |
| getPan | long | AudioPlayer | self | Gets the value of the pan (balance. |

The DigitalAudioPlayer class inherits methods that are generic to clocks from Clock methods that are generic to all players from Player and methods that are generic to playing sound from AudioPlayer.

The additional methods in DigitalAudioPlayer that are specific to playing digital audio ate listed below.

| Name | Type | Argument Type/Class | Argument | Description |
|---|---|---|---|---|
| getSampleRate | KUFixed | AudioPlayer | self | Gets the sample rate of the input stream. |
| setPitch NYI - not yet implemented | void | AudioPlayer short | self pitch | Sets the pitch for the sound that the player controls. Pitch is specified as MIDI note number. |
| getPitch NYI - not yet implemented | short | AudioPlayer | self | Gets the pitch of the sound that the player controls. |
| getCurrentSample | KDouble-Long | AudioPlayer | self | Returns a number that is the count of the current sample, offset from the beginning of the file. |
| getInputStream | object | AudioPlayer | self | Returns the AudioStream that the player plays. |
| setInputStream | void | AudioPlayer AudioStream | self stream | Sets the AudioStream that the player plays. |

Instance Methods on CDAudioPlayer

The CDAudioPlayer class inherits methods that are generic to clocks from Clock methods that are generic to all players from Player and methods that are generic to playing sound from AudioPlayer.

The additional methods in CDAudioPlayer that are specific to playing digital audio are listed below.

| Name | Type | Argument Type/Class | Argument | Description |
|---|---|---|---|---|
| setTrack | void | CDAudioPlayer long | self track | Sets the track. |
| getTrack | long | CDAudioPlayer | self | Gets the current track. |
| nextTrack | void | CDAudioPlayer | self | Sets the track value to the next track (after the current track value.) |
| previousTrack | void | CDAudioPlayer | self | Sets the track value to the previous track (to the current track value.) |

Playing Movies

The MoviePlayer class has methods for controlling the playing of movies. It inherits generic Player methods, such as play, stop and so on from the class Player. Additionally it has methods that are specific for controlling the playing of movies.

A MoviePlayer object has an associated Stream object that represents the movie to be played. The Stream contains the data for the movie. It is used to access all the movie's sample data, as well as all the control information for tracks and media (this is true for sound too.)[1]

[1]. Macintosh-based QuickTime movies will need to be converted into a compatible format for use with the player. The current strategy for file conversion involves using a single-fork, self-contained movie file (as created by the Macintosh Movie Toolbox function FlattenMovie).

Any type of stream can be used as the source for the movie's data, providing device and filesystem independence. The only requirements are that the stream supports seeking to an absolute location and reading a block.

Obviously, very slow streams will not produce optimum results with this player. Also, note that if a Bento stream is used, or if some other wrapper is placed around the movie data, then the location of the various data chunks relative to the beginning of the stream must be preserved for the player to be able to map the data correctly. In other words, the mapping information that was written to the file when it was recorded must remain valid when it is played back.

Specifying the Display Area for a Movie

Your application can specify what display device the movie is to be played on, and on what part of the device the movie should appear.

To specify the display device, call the MoviePlayer object's setGaraphicsWorld method. By default on Sweet Pea, the graphics device is the CRT screen.

To specify where on the display device the movie appears, set the bounds rectangle for the movie. You can do this by calling the MoviePlayer object's setMovieBounds method. By default on Sweetpea, the movie appears in a rectangle in the middle of the CRT screen. The bounds rectangle is determined by a Rect structure that specifies the top, left, right, and bottom values of the rectangle.

You can think of the bounds rectangle as being a movie screen.

When a movie is created, it has a default screen size associated with it. In general, you should not change the screen size, since the movie image will lose quality if it is resized to fit a different size screen.

However, you can change where on the display device the movie appears. To do this, you need to change the top left corner of the bounds rectangle without changing its width and height.

To move the top left corner of a Rect structure, use the KOffsetRect function. To find the current bounds rectangle of a movie, call the MoviePlayer's getMovieBounds method.

For example, the following function moves the movie screen by x pixels to the right and y pixels down from its original location:

```
void
OffsetMovieBounds (moviePlayer, x, y)
{
    KRect boundsRect;
```

-continued

```
getMovieBounds(moviePlayer, boundsRect);
offsetRect(boundsRect, x, y);
setMovieBounds(moviePlayer, boundsRect);
}
```

Clipping Region

In addition to specifying the size and location of the screen, you can specify a clipping region for the movie. The movie will only appear inside the clipping region.

By default on Sweet Pea, the clipping region is set to the default bounds rectangle.

The clipping region does not have to be a rectangular region. To specify a clipping region, call the setClipRgn method on the MoviePlayer object, and specify the region as a KRgnHandle. (See the Imaging Chapter for a discussion of how to create regions.)

Any part of the movie image that falls outside the clipping region will be clipped, so make sure that the clipping region and the movie's bounds rectangle overlap.

Movie Posters

MoviePlayer objects can display a single frame of a movie as a poster. Use the setPosterTime method on the MoviePlayer object to specify which time frame of the movie to use as the poster, and use the showPoster method to display the movie.

The poster uses the same display device, bounds rectangle and clipping region as the movie.

Controlling Sound for Movies

The MoviePlayer class has methods for controlling the sound volume of movie and tracks. Track volumes allow tracks within the movie to have different volumes. A track's volume is scaled by the movie's volume to produce the track's final volume.

Volume ranges from −1 to +1. Higher values indicate louder volumes. A value of 1 is equivalent to the loudest volume that can be played on the player. Negative values indicate muted volume. That is, the MoviePlayer does not play any sound for movies or tracks with negative volume settings. However, the original volume level is retained as the absolute value of the volume setting.

Tracks

A movie can consist of several tracks. It usually has one track for audio and one for video, and may have additional tracks. The MoviePlayer class has several methods that provide individual control of tracks, such as the setTrackVolume method that sets the volume for a specific track. When using these methods, refer to specific tracks by their track number, which is a number between one and the number of tracks in the movie, inclusive.

A Quicktime movie can contain alternate tracks that can be used to support multiple language or to present different levels of visual quality in a movie. Alternate tracks are arranged in groups when the movie is made.

The MoviePlayer selects one track from each group when it plays the movie. For example, a movie might have three separate audio tracks: one in English, one in French, and one in Spanish. These tracks would be arranged in a group. When the user plays the movie, the MoviePlayer selects the track from the group that corresponds to the current language setting for the movie.

Individual tracks can be enabled and disabled. For example, a movie could have two audio tracks, one for music and one for voice over. If you don't want to hear the voice over, you could disable the voice over track.

Preferred Movie Settings

Every movie has default, or preferred, settings for playback rate and volume. These settings are stored with the movie when it is created. The MoviePlayer object has methods for accessing these default settings, such as the getPreferredVolume method.

How to Play a Movie

To play a movie, create a Stream object for the movie data. Create a MoviePlayer object and specify the input stream.

To play a movie, call the play method on the MoviePlayer object.

So long as the movie has not been disabled, it will play. The movie appears in the previously-specified bounds rectangle on the previously-specified display device. Any part of the movie image that falls outside the clipping region will not appear.

On Sweetpea, the display device defaults to the CRT screen, and the bounds rectangle defaults to a rectangular region in the middle of the screen. The clipping region defaults to the bounds rectangle, so no clipping occurs.

When the play method on a MoviePlayer is called, the player plays the part of the movie specified by its play range, which defaults to the whole movie. You can use the setPlayRange method to specify the play range for the movie. This method takes arguments of the start time and the duration for the play range.

One example of the use of play ranges is to specify a play range that corresponds to a preview of the movie. For example, you could play the first five seconds of the movie as a preview.

Creating a New MoviePlayer

To create a new MoviePlayer, call the new method on the MoviePlayer class. The protocol for this is:

method object new (object self, object scream)

The arguments are:

| | |
|---|---|
| self | The class to be instantiated, which in this case is MoviePlayer. |
| inputStream | The Stream object that represents the movie data. You can pass this as NULL to specify no input stream. |

This method creates a new instance of the MoviePlayer object. By default the new player is synchronized to a hardware clock.

You can specify an input stream when you create a MoviePlayer or you can create the player without an input stream and then specify the input stream later by using the method setInputStream.

Code Example

Here's an example of the creation and use of a MoviePlayer object. This function takes a Stream that points to movie data. This example supposes that the frame at time 1 should be used as a poster, that the movie stream contains a preview between time 2 and 10, and the actual movie runs from time 12 to 112.

This function shows the poster for five time units, shows the preview, waits for five time units, then shows the movie.

```
void TestMoviePlayer (object movieStream)
{
```

```
    long    i, tracks;
    usesClass (MoviePlayer);
    /* Create a movie player object */
    moviePlayer = new (MoviePlayer, movieStream);
    /* Set the play range from time 12 for 100 time units */
    setPlayRange (moviePlayer, 12, 100);
    play(moviePlayer);
}
```

Instance Methods in MoviePlayer

MoviePlayer inherits methods that are generic to all players from Player and methods that are generic to all clocks from Clock.

The methods inherited from Player are discussed on page 4–19. They are:

| play       | record | stop     |
|------------|--------|----------|
| mediaEject | pause  | getMuted |

| setMuted  | playPrepare | unPrepare   |
|-----------|-------------|-------------|
| goToBegin | goToEnd     | getDuration |

The methods inherited from Clock that are relevant to Player objects are given below. They are discussed on page 4–10.

| getScale           | setScale           |
| getTime            | setTime            |
| getRate            | setRate            |
| getEffective-Rate  |                    |
| getFlags           | setFlags           |
| getMasterClock     | setMasterClock     |
| getRootClock       | getMasterRoot-Clock |
| servicingCallbacks |                    |

The additional methods on MoviePlayer that are specific to playing movies are listed below:

| Name | Type | Argument Type/Class | Argument | Description |
|------|------|---------------------|----------|-------------|
| setActive | void | object<br>KBoolean | self<br>active | Sets the movie player to be active or not. |
| getActive | KBoolean | object | self | Returns true if the movie player is active. |
| isDone | KBoolean | object | self | Returns 1 if the movie has completely finished playing, else returns 0.<br>A movie with a positive rate (it's playing forward) is considered done when its movie time reaches the end movie time.<br>Conversely, a movie with a negative rate (it's playing backward) is considered done when its movie time reaches the movie start time. |
| setPlayRange | void | object<br>COSTimeValue<br>COSTimeValue | self<br>startTime<br>duration | Defines a movie's active segment.<br>Specif the starting time and duration of the active segment, which must be given in the movie's time scale. |
| getPlayRange | void | object<br>COSTimeValue<br>COSTimeValue | self<br>*startTime<br>*duration | Determines what portion of the movie is currently active for playing. This will be the range set by setPlayRange if it has been called. The default is the entire movie if setPlayRange has not been called. |
| showPoster | void | object | self | Display's a movie's poster.<br>The movie player draws the movie poster once, in the same area in which the movie appears. |
| setPosterTime | void | object<br>COSTimeValue | self<br>posterTime | Sets the poster time for the movie. Since the movie poster is a still frame, it is defined by a point in time within the movie..<br>The poster time is in the movie player's |

| Name | Type | Argument Type/Class | Argument | Description |
|---|---|---|---|---|
| getPosterTime | COSTime-Value | object | self | time scale. Returns the poster's time in the movie. Since the movie poster has no duration, a poster is defined by a point in time within the movie. The time value returned is in the movie player's time scale. |
| Time Control | Several of these methods take a track argument, which is the number of the track. The first track is 1.0, the second track is 2 and so on. | | | |
| getPreferredRate | KFixed | object | self | Returns the default playback rate of the movie. This is the rate the play method uses when it starts playing the movie.) The movie player multiplies its normal playback rate by the playback rate value to obtain the playback rate for your movie. For example, if a movie's playback rate value is 2, the movie player plays the movie at twice normal speed. The rate is returned as a 32-bit, fixed-point number. The high order 16 bits contain the integer part and the low-order 16 bits contain the fractional part. Positive integers indicate forward rates and negative integers indicate reverse rates. |
| getTrackDuration | COSTime-Value | object long | self track | Returns the duration of a track. The duration corresponds to the ending time of the track in the movie player's time scale. |
| setTrackOffset | void | object long COSTimeValue | self track offset | Sets the time difference between the start of a track and the start of the movie. This method modifies the duration of the empty space that lies at the beginning of the track, thus changing the duration of the entire track. Specify this time offset as a time value in the movie player's time scale. |
| getTrackOffset | COSTime-Value | object long | self track | Returns the time difference between the start of a track and the start of the movie that contains the track. |
| Graphics | | | | |
| setGraphicsWorld | void | object object | self graphic-Device | Sets the graphic device where the movie will play. On Sweet Pea, the default graphic device is the crt screen. |
| setMovieBounds | OSErr | object KRect* | self bounds-Rect | Set the rectangular region in which the movie appears when it is played. The movie will be scaled to fit the rectangle. |

-continued

| Name | Type | Argument Type/Class | Argument | Description |
|---|---|---|---|---|
| | | | | Each movie has a default boundsRect that is the correct size for that movie. In general you are recommended not to change the boundsRect since the movie image will lose quality if it is resized. If you want the movie to appear in a different part of the screen other than the default boundsRect, you can use the offsetRect function to offset the boundsRect rectangle structure. (See the Imaging chapter for details of offsetRect.) |
| getMovieBounds | void | object KRect | self *rect | Sets the rect rectangle structure to have the same values as the rectangular region that defines the screen for the movie. |
| setDisplayClipRgn | void | object KRgnHandle | self clipRgn | Set the clipping region for the movie. The default clipping region on Sweetpea is the area that defines the movie bounds. Any part of the movie image that falls outside the clipping region will be clipped. So make sure that the clipping region and the movie's bounds rectangle overlap. |
| getDisplayClipRgn | KRgnHandle | object | self | Returns the clipping region for the movie. |
| pointInMovie | KBoolean | object KPoint | self point | Returns true if the point is in the region where the movie will play. |
| Sound | | | | Volume ranges from −1 to +1. Higher values indicate louder volumes. A value of 1 is equivalent to the loudest volume that can be played on the player. Negative values indicate muted volume. That is, the MoviePlayer does not play any sound for movies or tracks with negative volume settings. However, the original volume level is retained as the absolute value of the volume setting. Many of these methods take a track argument, which is the number of the track. The first track is 1.0, the second track is 2 and so on. |
| setMovieVolume | void | object long | self volume | Sets the volume for the movie. |
| getMovieVolume | short | object | self | Returns the volume of the movie. |
| getPreferredVolume | short | object | self | Returns the default volume of the movie. |
| setTrackVolume | void | object long long | self track volume | Sets the volume of a track. A track's volume is scaled by the movie's volume to produce the track's final volume. |
| getTrackVolume | short | object long | self track | Returns the volume for a given track. |
| setTrackPan | void | object long long | self track pan | Sets the pan (balance) for a track. |
| getTrackPan | short | object long | self track | Returns the pan (balance) for a given track. |
| Alternate Tracks | | | | |
| getTrackCount | short | object | self | Returns the total number of tracks in |

-continued

| Name | Type | Argument Type/Class | Argument | Description |
|---|---|---|---|---|
| getTrackMediaType | long | object<br>long | self<br>track | the movie.<br>Returns the media type of the track. |
| setTrackEnabled | void | object<br>long<br>long | self<br>track<br>enable-<br>OrNot | If enableOrNot is 1, the movie player enables the given track.<br>If enableOrNot is 0, the movie player disables the given track.<br>If a track is enabled it can be played. If it is disabled, it cannit be played.<br>All tracks are enabled by default. |
| getTrackEnabled | KBoolean | object<br>long | self<br>track | Returns 1 if the given track is enabled, or 0 if it is disabled. |
| setLanguage | void | object<br>long | self<br>language | Specifics the language for a movie.<br>The movie player examines the movie's alternate groups and selects and enables an appropriate track. If the player cannot find an appropriate track, it does not change the movie's language. |
| selectAlternates | void | object | self | Causes the movie player to select appropriate tracks immediately.<br>You can call this method even if you have disabled automatic track selection with the AutoAlternates method. |
| autoAlternates | void | object<br>KBoolean | self<br>enable | If enable is 1, enables automatic track selection by the movie player. If enable is 0, disables automatic track selection.<br>When automatic track selection is enabled, the movie player immediately selects active tracks for the movie. |
| getTrackLanguage | short | object<br>long | self<br>track | Returns the language or region code of the given track. |
| getTrackQuality | short | object<br>long | self<br>track | Returns a track's quality level value.<br>The Movie Player uses this quality value to influence which track it selects to play on a given computer. |

The quality value indicates the pixel depths at which
the track's media can be played. This even applies to
sound media. The low-order 6 bits of the quality value
correspond to specific pixel depths. If a bit is set to 1,
the media can be played at the corresponding depth.
More than one of these bits may be set to 1.
The following bits are defined:
    bit 0    1 bit per pixel
    bit 1    2 bits per pixel
    bit 2    4 bits per pixel
    bit 3    8 bits per pixel
    bit 4    16 bits per pixel
    bit 5    32 bits per pixel
In addition, bits 6 and 7 define the media's quality
level. A value of 0 corresponds to the lowest quality
level; a value of 3 corresponds to the highest quality

| Name | Type | Argument Type/Class | Argument | Description |
|---|---|---|---|---|
| | | level: mediaQualityDraft - Specifies the lowest quality level. This constant sets bits 6 and 7 to a value of 0. mediaQualityNormal - Specifies an acceptable quality level. This constant sets bits 6 and 7 to a value of 1. mediaQualityBetter - Specifies a higher quality level. This constant sets bits 6 and 7 to a value of 2. mediaQualityBest - Specifies the highest quality level. This constant sets bits 6 and 7 to a value of 3. | | |
| Creation Information | | | | |
| getInfo | void | object long* long* | self created modified | Returns the movies creation date/time and the modification date/time. The timestamp indicates the number of seconds since January 1, 1904.. |
| getTrackInfo | void | object long long* long* | self track created modified | Returns the specified tracks's creation date/time and modification date/time. The timestamp indicates the number of seconds since January 1, 1904.. |

Appendix 6

Instance Methods on CallBack Subclasses

| Name | Type | Argument Type | Argument | Description |
|---|---|---|---|---|
| getClock | object | object | CallBack | Returns the clock to which this CallBack is attached. |
| callMeWhen | void | object CallBack-Proc void long long Time-Record CallBack-Priority | CallBack CallBack Proc *CallBack-ProcParam flags rateORline *timerec queueID | Specifies the procedure to be called when the CallBack is activated and specifies how and when the CallBack is to be activated. |
| dispose | void | object | CallBack | Disposes of the CallBack object. |
| cancelCallBack | void | object | CallBack | Cancel the pending CallBack. The user must call dispose on the CallBack to dispose it. |

Appendix 7

Audio Stream Methods

```
/* stream support */
readBlock              - gets a block of sound
streamLength           - length of stream
cursor                 - current position
pastEnd                - returns boolean
seekFromStart          - seek from beginning of media
seekFromCursor         - seek from current position
/* Sample messages */
getSampleSize
getSampleRate
getSampleType
getCompType
getPackingType
getNumFrames
getNumChannels
setDirection           - forward or reverse
getDirection
parseSoundData         - called to convert external formats to
                         internal format
computeApparentSize    - varies depending on sample size,
```

-continued

| | compressed, etc. |
|---|---|
| allocateBuf | - buffer used for intermediate conversions |
| deAllocateBuf | |
| setPreferredSampleType | - type preferred by audio driver |
| getPreferredSampleType | |
| setPreferredByteSize | |
| getPreferredByteSize | |
| /* Player methods */ | |
| setInputstream | - stream from which we get data |
| getAudioRecord | - pointer to properties |
| playPrepare | - gets stream ready for playback |
| playUnprepare | |
| /* Clock methods */ | |
| setRate | - rate determines buffer filling |
| getRate | |
| askRate | |

Appendix 8
Audio Channel Driver Methods

| getMaxBufSize | - maximum buffer size for driver |
|---|---|
| setPreferredSampleType | - prefferred sample type (multiple possible) |
| getPreferredSampleType | |
| setPreferredByteSize | |
| getPreferredByteSize | |
| setSampleRate | |
| getSampleRate | |
| setPackingType | |
| getPackingType | |
| setSampleType | |
| getSampleType | |
| setSampleSize | |
| getSampleSize | |
| getCompType | |
| resetCDXAFilter | |
| setCDXAFilter | |
| getCDXAFilter | |
| setPlayer | - the player this driver is connected to |
| getPlayer | |
| setGain | |
| getGain | |
| getGainLeft | |
| getGainRight | |
| setPan | |
| getPan | |
| setChannelPtr | |
| getChannelPtr | |
| setRate | |
| getRate | |
| askRate | |
| computeVolume | - computes volume from gain and pan |
| play | |
| playPrepare | |
| playUnprepare | |
| stop | - operates like pause |
| finished | |
| fillBuffer | - buffer management |
| bufferFilled | |

What is claimed is:

1. A method for clock-synchronized play of a media stream, for use in an object-oriented environment an a digital computer, said method comprising the following steps:
    specifying a clock class including at least one clock method for generating a stream of time values;
    specifying a player class including at least one player method for causing the media stream to be played, and wherein said player class inherits from said clock class;
    instantiating at least one player object belonging to the player class;
    generating the stream of time values, using the player object's inherited clock method; and
    playing the media stream in synchronization with the stream of time values, using the player object's player method.

2. The method of claim 1, wherein the stream of time values generated by each clock class object is derived from a master stream of time values generated by a master clock associated with the clock class object.

3. The method of claim 2, wherein the master stream of time values generated by the master clock is itself hierarchically derived from another master stream generated by another master clock.

4. The method of claim 2, further including the step of transmitting one or more messages to each associated clock class object announcing a modification to a rate or scale of the master stream.

5. The method of claim 1, further including the step of scheduling, in advance, the step of playing the media stream.

6. The method of claim 5, wherein the step of scheduling in advance further includes the steps of:
   creating a call-back object specifying a starting time for play of the media stream; and
   transmitting, at the specified starting time, a message from the call-back object to the media player requesting play of the media stream.

7. The method of claim 1, wherein the media stream comprises video data, and wherein the step of playing the media stream comprises displaying the video data on a video monitor.

8. The method of claim 1, wherein the media stream comprises audio data, and wherein the step of playing the media stream comprises outputting the audio data through an audio speaker.

9. An apparatus for clock-synchronized play of a media stream, for use in an object-oriented environment in a digital computer, said apparatus comprising:
   means for specifying a clock class, including at least one clock method for generating a stream of time values;
   means for specifying a player class which inherits from said clock class and further includes at least one player method for causing the media stream to be played;
   means for instantiating one or more player objects belonging to the player class;
   means for generating the stream of time values, using the player object's inherited clock method; and
   means for playing the media stream in synchronization with the stream of time values, using the player object's player method.

10. The apparatus of claim 9, further including means for instantiating a master clock object belonging to said clock class, and means for associating the master clock object with the player object, and wherein the means for generating the stream of time values is operable to derive the stream of time values from the associated master clock object.

11. The apparatus of claim 10, wherein the associated master clock object is itself hierarchically related to another master clock object.

12. The apparatus of claim 10, further including means for transmitting one or more messages to each associated player object announcing a modification to a rate or scale of the master clock object.

13. The apparatus of claim 9, further including means for scheduling operably coupled to the means for playing the media stream.

14. The apparatus of claim 13, wherein the means for scheduling comprise:
   at least one call-back object specifying a starting time for play of the media stream; and
   means for transmitting, at the specified starting time, a message from the call-back object to the means for playing, said message requesting play of the media stream.

15. The apparatus of claim 9, wherein the media stream comprises video data, and wherein the means for playing the media stream comprises means for displaying the video data on a video monitor.

16. The apparatus of claim 9, wherein the media stream comprises audio data, and wherein the means for playing the media stream comprises means for outputting the audio data through an audio speaker.

* * * * *